Figure 1:
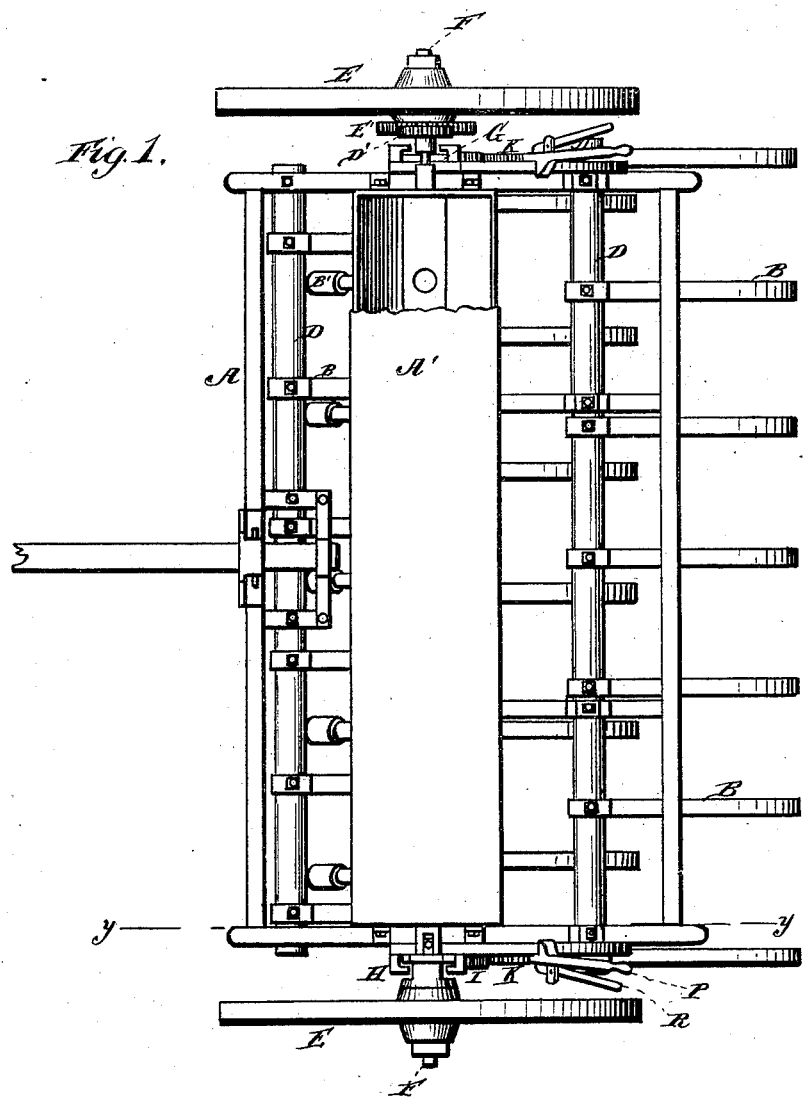

(No Model.)  2 Sheets—Sheet 1

H. SPRINGER.
Spring Tooth Cultivator with Harrow Attachment.

No. 232,083. Patented Sept. 7, 1880.

Witnesses.
Robert Everett
James J. Sheehy

Inventor.
Henry Springer
J. Clement Smith
Attorney.

(No Model.) 2 Sheets—Sheet 2.
H. SPRINGER.
Spring Tooth Cultivator with Harrow Attachment.
No. 232,083. Patented Sept. 7, 1880.
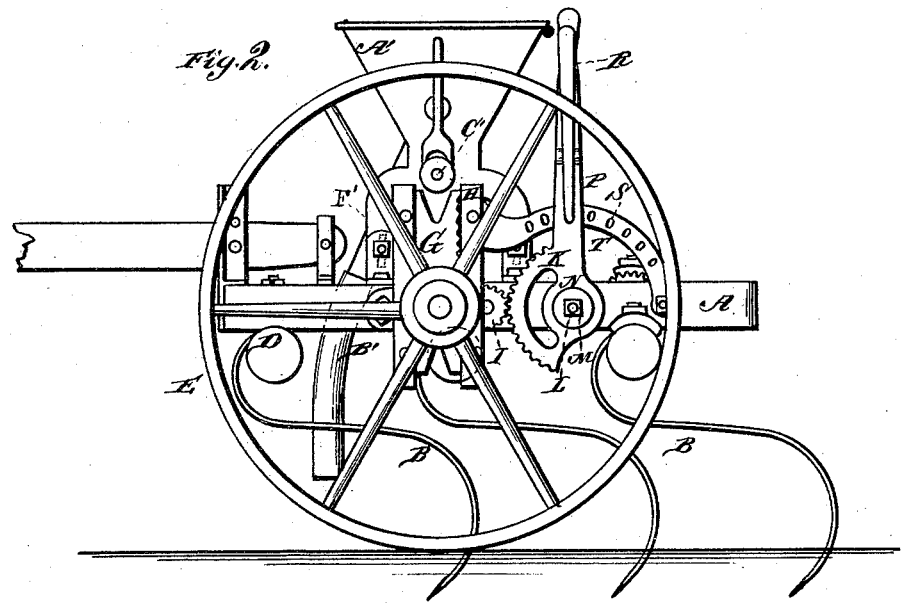
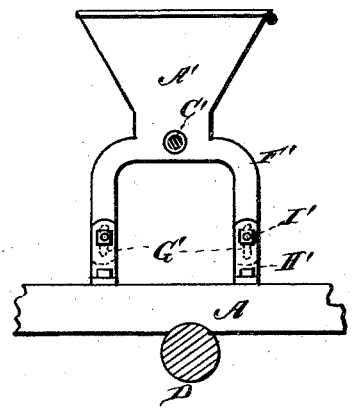
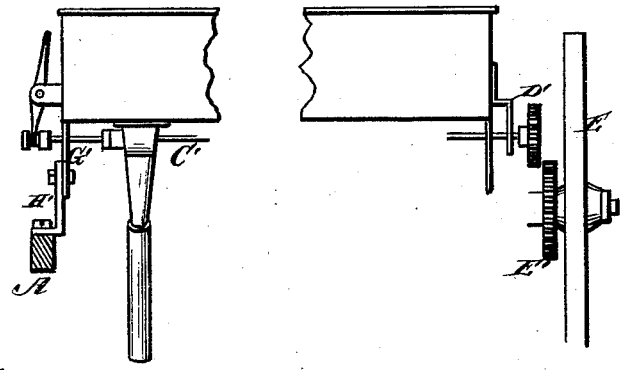
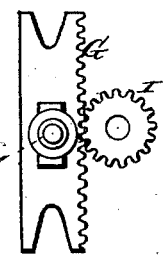
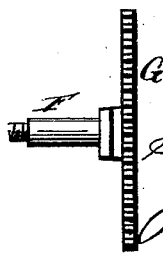

UNITED STATES PATENT OFFICE.

HENRY SPRINGER, OF VICKSBURG, MICHIGAN.

SPRING-TOOTH CULTIVATOR WITH HARROW ATTACHMENT.

SPECIFICATION forming part of Letters Patent No. 232,083, dated September 7, 1880.

Application filed July 10, 1880. (No model.)

*To all whom it may concern:*

Be it known that I, HENRY SPRINGER, a citizen of the United States, resident at Vicksburg, in the county of Kalamazoo and State of Michigan, have invented certain new and useful Improvements in Spring-Tooth Cultivators with Seeder Attachment; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in spring-tooth cultivators, and is designed as an improvement upon the invention for which Letters Patent of the United States were granted to me the 10th day of February, 1880, No. 224,487.

The invention has for its objects to provide an improved means for elevating and depressing the frame of the cultivator upon its wheels, and also to provide for adjusting a seeder with respect to said frame, and the mechanism for elevating and depressing it, as more fully hereinafter specified.

These objects I attain by the mechanism illustrated in the accompanying drawings, in which—

Figure 1 represents a top view of a cultivator constructed according to my invention; Fig. 2, a side elevation thereof; and Fig. 3, a section taken on the line *y y* of Fig. 1, showing the extensions of the seeder and the method of attaching the same to the frame of the cultivator. Fig. 4 represents detached views, showing seeder and mechanism for attaching and operating the same; and Figs. 5 and 6 represent detached views of the devices for elevating the frame on the wheels.

The letter A indicates the frame of the cultivator, carrying the spring-teeth B, which approximate in configuration a letter S, and are secured to the transverse shafts D. The said teeth are secured to the shaft, and are in general construction similar to the teeth as shown in my before-mentioned patent; and as they form no part of the present invention *per se*, a detailed description of the same and their method of attachment is deemed unnecessary here.

The letters E E indicate the supporting-wheels of the cultivator, which are mounted, respectively, on the short axles F F, which are secured to and project laterally from the racks G G, which are located and adapted to slide vertically in grooved ways H H at opposite sides of the frame A. The teeth of said rack engage a pinion, I, respectively, one pinion being mounted at each side of the frame in a slot at one side of the grooved ways in which the rack is located. The teeth of said pinion engage those of the rack on one side, and on the opposite side intermesh with the teeth of a segment, K, journaled on a hub, L, formed on the frame A and secured to said hub by means of a nut, M, and washer N. The said segment is provided with a lever, P, and a rock-lever, R, the latter being adapted to engage the apertures S in a curved guard, T, so as to secure the segment in any desired position.

The letter A' indicates the seeder, consisting of a transversely-extending hopper provided with the usual seed-dropping tubes B' and longitudinal feeding-shaft C', the latter being provided at one end with a pinion, D', adapted to engage a gear-wheel, E', mounted on one of the wheels, so as to be rotated thereby when the wheels are rotated. The said seeder is provided at each end with downward extensions F', slotted in the direction of their length, as indicated by the letter G', and secured to the upright standards H' by means of the set-screws and nut I', whereby the said seeder may be elevated or depressed to accord with the adjustment of the frame and adapt the machine to work at various depths, as may be desired.

The operation of my improved invention will be perfectly clear from the foregoing description without further explanation.

Having thus fully described my invention, what I claim, and desire to secure by Letters Patent, is—

In a combined cultivator and seeder, the short axles F, mounted upon the vertically-sliding racks G, working in the ways H at opposite sides of the frame A, the pinions I, and segmental levers P, in combination with the seeder A', provided with the downward extension F', vertically adjustable on the standards H' by means of set-screws I', constructed and operating substantially as and for the purposes set forth.

In testimony whereof I have affixed my signature in presence of two witnesses.

HENRY CLINGER.

Witnesses:
J. H. BOSTWICK,
C. W. BOWEN.